United States Patent [19]
Allen

[11] Patent Number: 5,933,590
[45] Date of Patent: Aug. 3, 1999

[54] RESTORATION OF MULTIPLE SPAN CUTS WITH PRIORITY HAND-OFF USING SHN

[75] Inventor: John David Allen, Garland, Tex.

[73] Assignee: MCI Communications Corporation, Washington, D.C.

[21] Appl. No.: 08/634,319

[22] Filed: Apr. 18, 1996

[51] Int. Cl.⁶ ........................................... H04J 3/12
[52] U.S. Cl. ................ 395/182.02; 370/218; 340/825.01
[58] Field of Search ............................. 395/182.02, 181, 395/182.18; 370/16, 16.1, 94.3, 228, 217, 218, 216, 221, 225; 340/825.01, 827

[56] References Cited

U.S. PATENT DOCUMENTS

| | | | |
|---|---|---|---|
| 4,393,493 | 7/1983 | Edwards | 370/16 |
| 4,956,835 | 9/1990 | Grover . | |
| 5,146,452 | 9/1992 | Pakarske . | |
| 5,168,495 | 12/1992 | Smith | 370/85.6 |
| 5,235,599 | 8/1993 | Nishimura et al. | 371/11.2 |
| 5,459,716 | 10/1995 | Fahim | 370/16 |
| 5,461,608 | 10/1995 | Yoshiyama | 370/16.1 |
| 5,469,439 | 11/1995 | Thaler | 370/94.3 |
| 5,479,608 | 12/1995 | Richardson | 395/182.02 |
| 5,495,471 | 2/1996 | Chow et al. | 370/16 |
| 5,513,345 | 4/1996 | Sato | 395/182.02 |
| 5,519,709 | 5/1996 | Albreht | 370/94.3 |
| 5,537,532 | 7/1996 | Chng | 395/182.02 |
| 5,548,639 | 8/1996 | Ogura et al. | 379/221 |
| 5,550,805 | 8/1996 | Takatori | 370/16.1 |
| 5,581,791 | 12/1996 | Ludwig et al. | 395/860 |
| 5,768,256 | 6/1998 | Allen et al. | 370/218 |

OTHER PUBLICATIONS

Grover, W.D., "The Selfhealing Network: A Fast Distributed Technique for Networks Using Digital Crossconnect Machines," in *Proc. IEEE Global Conf. Commun.*, Tokyo, Japan, 1987, vol. 2, pp. 28.2.1–28.2.6.

Grover, W.D., "Distributed Restoration of the Transport Network," Chapter 11, *Telecommunications Network management into the 21st Century, Techniques Standards, technologies and Applications*, Salah Aidarous and Thomas Plevyak editors, IEEE Press, ISBN 0–7803–1013–6, 1994, pp. 337–417.

Grover, et al., "Development and Performance Assessment of a Distributed Asynchronous Protocol for Real–Time Network Restoration," in *IEEE Jornal on Selected Areas in Communications*, vol. 9, No. 1, Jan. 1991, pp. 112–125.

*Primary Examiner*—Dieu-Minh T. Le

[57] ABSTRACT

A system and method for restoring communications in a network having multiple span failures. After a failure is detected, a sender node in each of the plurality of sender-chooser pairs sends a failed status message to the other nodes in the network. The failed status message identifies a restoration priority of the particular sender-chooser pair. Upon receipt, other nodes in the network suspend processing of lower priority restoration efforts and queue lower priority messages if they are preempted by higher priority messages. Lower priority restoration efforts resume upon receipt of a finished status message from the sender node of the higher priority sender-chooser pair.

17 Claims, 8 Drawing Sheets

RESTORATION OF MULTIPLE SPAN CUTS WITH PRIORITY HAND-OFF USING SHN

BACKGROUND OF THE INVENTION

1. Field of the Invention

The present invention relates generally to network restoration, and more specifically the present invention is directed toward distributed network restoration using prioritized restoration signals.

2. Related Art

A telecommunications network comprises a plurality of nodes connected together by logical spans that may comprise links of optical fibers. If any of the fibers are cut, the traffic through a portion of the network is disrupted. In conventional solutions, automatic protection switching (e.g., 1:1 or 1:N) moves disrupted traffic to dedicated spare circuits promptly, typically in less than 50 milliseconds. However, this automatic protection switching requires a high dedicated spare channel capacity.

Similarly, self-healing rings (e.g., unidirectional or bidirectional) suffer from the same problem of high dedicated spare channel capacity. In this network solution, a common protection ring is shared by all of the nodes on the ring. Although switching times are attractive in ranging from 50–200 milliseconds, self-healing rings prove inflexible when considering provisioning, growth and maintenance issues. Moreover, self-healing rings are limited in their response to multiple failure scenarios.

Digital cross connect mesh architectures, on the other hand, provide the maximum flexibility in responding to network failures. In these systems, each node contains one or more digital cross connect systems that connect via logical spans to a plurality of other nodes in a mesh-like configuration. The spare capacities in each of the logical spans contributes to the survivability of other spans in the network.

There are two distinct types of digital cross connect mesh architectures: centralized and distributed. In a centralized mesh architecture, a centralized intelligence has a built in knowledge of the different nodes and links of the network and a defined solution for a particular failure scenario. A disadvantage of this scheme is that the topology of the network has to be stored in a centralized database that requires updating any time a network change occurs (e.g., addition or removal of links). Additionally, the restoration time is typically on the order of minutes.

In a distributed mesh architecture, the intelligence is distributed in each of the nodes of the network. This intelligence is created through a variety of signaling messages that are passed between adjacent nodes. Currently, there are two types of distributed restoration schemes: span (or link) based and path based. In path based schemes, the shortest and/or most reasonable end-to-end alternate route throughout the network is found.

In link based schemes, on the other hand, the shortest and/or most reasonable alternate route is identified between the nodes adjacent to the failed link. One example of a conventional link based solution is described in U.S. Pat. No. 4,956,835 to Grover which is herein incorporated by reference in its entirety. This technique is commonly referred to as "Selfhealing Networks"™ or "SHN." SHN is a protocol consisting of restoration-specific data structures that are communicated through the network, operating logic within each network node, and a defined sequence of network events to accomplish restoration.

Generally, Grover's SHN algorithm is directed to the restoration of a failure in a single logical span. If failures in multiple logical spans exist, multiple sender-chooser pairs compete for a finite set of spare resources. An efficient distributed restoration algorithm must therefore provide a mechanism for solving this resource contention problem.

SUMMARY OF THE INVENTION

The present invention satisfies the above mentioned needs by controlling the interaction between competing restoration efforts in a network. Specifically, the present invention prioritizes each restoration effort based upon the unique values of a sender-chooser pair. The priorities are determined by each node based upon a common scheme.

Upon a failure in at least one link in a span, the sender node of the sender-chooser pair adjacent to the failure sends out a failed status message to the other nodes in the network. The failed status message includes the priority of the sender-chooser pair and hence the priority of the restoration effort associated with that sender-chooser pair. Those nodes within a predefined hop-limit that receive the failed status messages compare the priority of the failed status message with the priorities of any ongoing restoration efforts with which they are currently involved (i.e., sending or forwarding SHN messages).

If the received failed status message has a lower priority, the ongoing restoration effort is not affected. Any messages that are received for the lower priority restoration effort are queued for later transmission. However, if the failed status message has a higher priority, the ongoing restoration effort is suspended. In other words, no further transmission of lower-priority messages is allowed. Any messages that are later received for the higher-priority restoration effort are then forwarded (if possible).

Generally, the forwarding of messages is allowed if unused spare ports are available or if spare ports have been used by lower-priority restoration efforts. In the later case, the higher-priority restoration messages replaces a lower-priority restoration message. The replaced lower-priority restoration message is then placed in a queue associated with the span that includes the outgoing port.

The dedication by the affected nodes to the higher-priority restoration effort continues until a finished status message is sent by the sender node of the higher-priority sender-chooser pair. Conditions for sending the finished status message include the complete restoration of all failed links or the expiration of a sender timeout timer that limits the duration of the restoration effort.

After the finished status message is received by a node, the node can then resume processing of the next highest-priority restoration effort. This process includes the determination of whether any queued messages associated with the next highest-priority restoration effort can now be sent on unused ports or ports that previously sent a lower-priority restoration message.

BRIEF DESCRIPTION OF THE FIGURES

The foregoing and other features and advantages of the invention will be apparent. from the following, more particular description of a preferred embodiment of the invention, as illustrated in the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

A communications network serves to transport information among a number of locations. The information to be transported is usually presented to the network in the form of time-domain electrical signals and may represent any combination of telephony, video, or computer data in a variety of formats. To transport such information, a typical communications network consists of various physical sites, or "nodes," and information conduits, called "links," that interconnect the nodes. Each link carries information from one node to another node. Each node contains equipment for combining, separating, transforming, conditioning, and routing the information signals. An example of a typical commercially available switch that can serve as a node is the Model 1633-SX Digital Cross-Connect Switch manufactured by Alcatel Network Systems.

Figure 1:
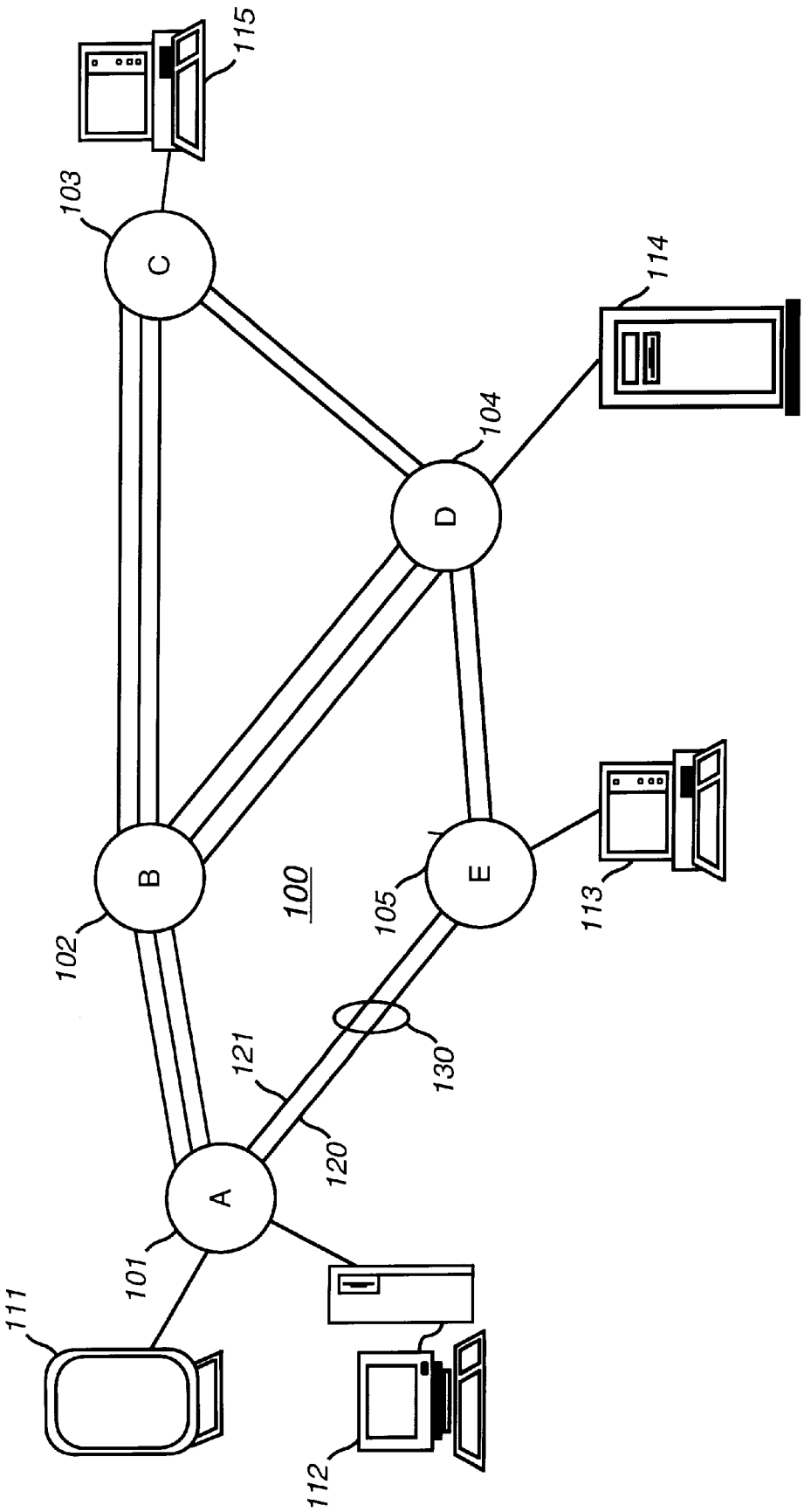
FIG. 1 illustrates an exemplary telecommunications network.

FIG. 1 shows an exemplary communications network 100 that consists of nodes 101–105. Nodes 101–105 are further connected by a plurality of links. For example, nodes 101 and 105 are connected by links 120 and 121. Together, links 120 and 121 form a "span" 130 between nodes 101 and 105. Generally, the plurality of links within a span includes links that are dedicated as spare capacity. This spare link capacity allows the network to use rerouting to recover from partial failures by circumventing the failed links or network elements.

Conventional systems exemplified by SHN, have identified a method for recovering from single span failures within a network. The present invention expands upon this basic functionality by identifying a method for coordinating ongoing restoration efforts for multiple span failures. Multiple span failures can arise through various failure scenarios. In one scenario, multiple cable cuts sever multiple spans within a network. This scenario occurs infrequently due to the low probability of two cable cuts occurring at or around the same time.

Figure 2A:
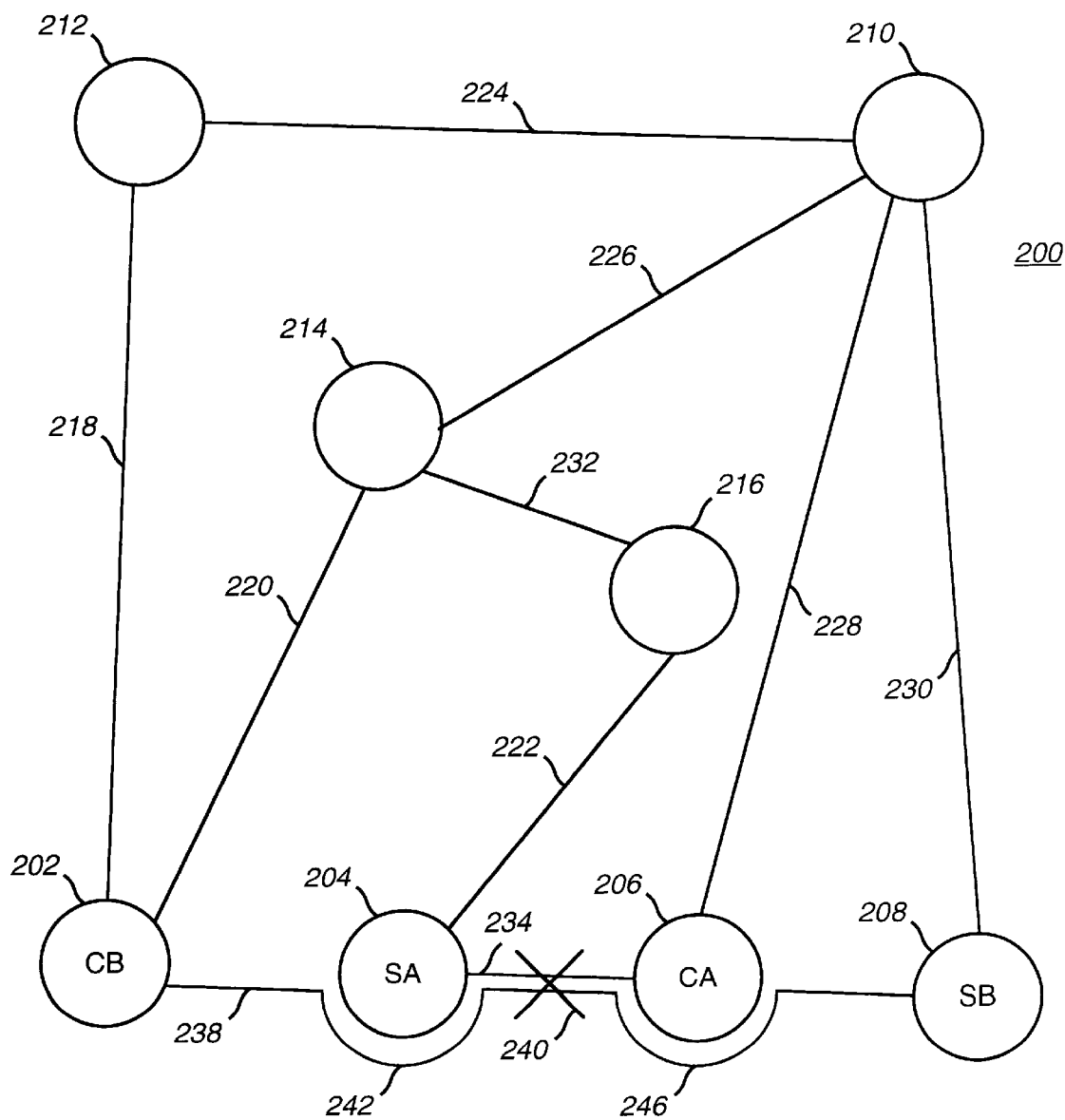
FIGS. 2A and 2B illustrate an example of a multiple span failure and possible restoration paths.

In a second scenario, a single cable cut severs multiple spans within a network. FIG. 2A illustrates this second scenario. Shown within network 200 are the spare links connecting nodes 202, 204, 206, 208, 210, 212, 214, and 216. In network 200, the span between nodes 202 and 208 and the span between nodes 204 and 206 are routed together in a physical conduit between nodes 204 and 206. As shown, spare link 238 logically connects node 202 to node 208 but physically passes through nodes 204 and 206 as depicted by pass throughs 242 and 246. This scenario can arise due to limited rights-of-way (e.g., bridge span) that are available to the service provider. A single failure 240 may therefore affect both spans between nodes 202–208 and nodes 204–206 even though they are logically distinct.

In response to single failure 240, nodes 202, 204, 206, and 208 will attempt to restore the traffic that was previously routed in the physical conduit between nodes 204 and 206. The present invention builds upon the general SHN process by coordinating the simultaneous individual restoration efforts. Prior to discussing the present invention in detail, a brief discussion of the SHN process is provided.

The basic SHN process begins with the assignment of roles (i.e., sender or chooser) to the nodes adjacent to a span failure. Upon the detection of at least one link failure within the span, the sender and chooser roles are determined based upon some simple criterion such as comparison of assigned unique node ID numbers (e.g., the node having the higher ID number becomes the sender).

After this assignment is complete, the sender emits a forward-flooding message along spare links in all spans to which it is connected. This forward-flooding message contains information that indicates it is restoration related. The forward-flooding message also contains data fields that identify the sender and chooser nodes. Other intermediate nodes (or tandem nodes) that receive this forward-flooding message further propagate the message along other spare links to which they are connected. Thus, the original forward-flooding message from the sender is broadcast throughout the network. This broadcast is limited by a maximum predefined hop-count.

Eventually, one or more of these forward-flooding messages reaches the chooser node. The chooser node collects and reviews the incoming forward-flooding messages that arrive via different routes and applies a logical scheme to select a shortest (or most reasonable) path for restoration of traffic. Upon selecting a suitable restoration path, the chooser node returns a reverse-linking message back along the selected path. The intervening tandem nodes recognize the reverse-linking message and perform both switching and propagation of the reverse-linking message in such a way as to secure the path that ultimately joins the sender and chooser nodes.

This technique is applied independently for every separate link that fails. The failed links are often restored over completely separate routes through the network depending on availability of spare links. If failures occur along more than one logical span, then separate instances of the SHN protocol are initiated to restore failed links in each span.

One problem that arises due to these separate restoration efforts is "glare." Glare occurs when two restoration processes attempt to select the same link from opposite directions. When this occurs, one of the restoration processes can be precluded from identifying a restoration route. For example, consider the competing restoration efforts between sender-chooser pairs SA-CA and SB-CB in FIG. 2A. If sender-chooser pair SB-CB secures the restoration path represented by links 220, 226 and 230, sender-chooser pair SA-CA has no path out of node 214. The restoration efforts of sender-chooser pair SA-CA consequently fail.

Figure 2B:
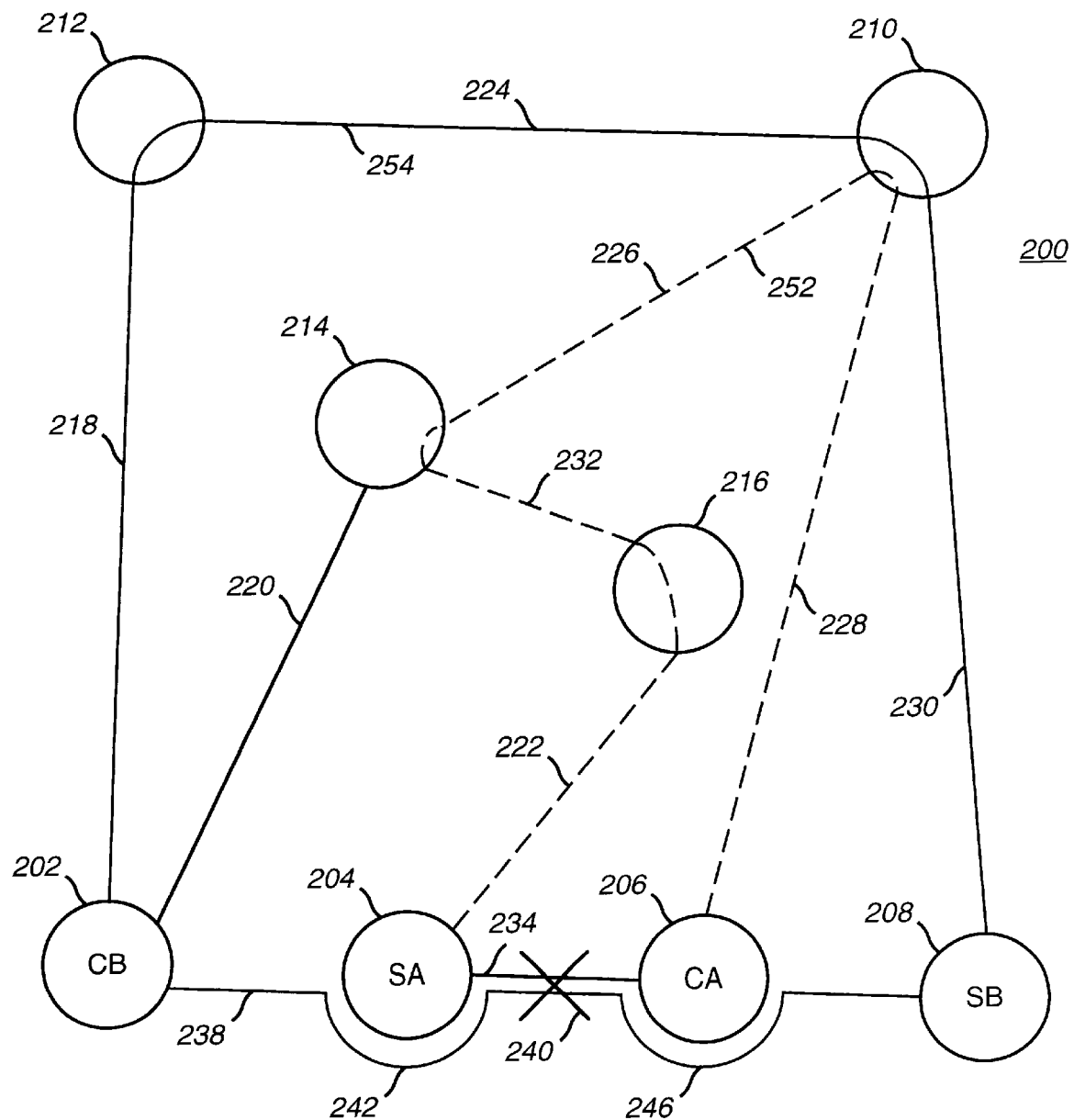

FIG. 2B depicts two restoration paths 252 and 254 that would successfully restore a failed link between nodes 204–206 and nodes 202–208, respectively. Restoration path 252 comprises links 222, 232, 226, and 228. Restoration path 254 comprises links 218, 224, and 230. This optimal restoration scenario could elude the logic of conventional network restoration mechanisms. As will be described in greater detail below, restoration paths 252 and 254 would be found if the restoration effort of sender-chooser pair SA-CA was assigned a higher priority than the restoration effort of sender-chooser pair SB-CB.

In accordance with the present invention, the assignment of priorities to distinct restoration efforts (i.e., distinct sender-chooser pairs) is used to prioritize the discovery of restoration paths. More specifically, the nodes in the network temporarily suspend processing of lower-priority restoration efforts until a higher priority restoration effort is completed. This approach reduces the amount of active messages in the network, and virtually eliminates the contention for restoration resources by more than one sender-chooser pair.

Figure 3:
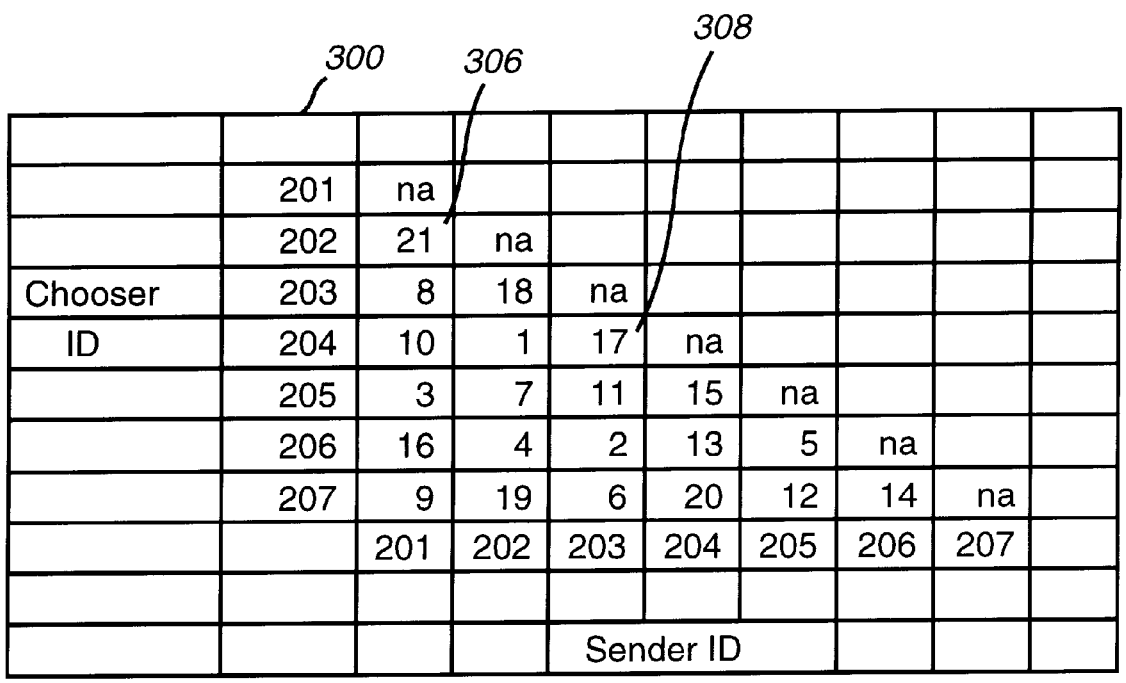
FIG. 3 illustrates a look-up table that maps pairs of sender-chooser node IDs to relative priority numbers.

Prior to describing the coordination between restoration efforts having different priorities, a system and method for assigning priorities is first described. This prioritization can be accomplished in a variety of ways. In a preferred embodiment, each sender node contains a look-up table of priority numbers indexed by sender-chooser node IDs as shown in FIG. 3. Generally, priority look-up table 300 is populated with unique relative priority numbers (e.g., 1 through 21) or any value that permits comparisons. In other embodiments, look-up table 300 can be a linear table, linked list, or other equivalent data structure. The contents of look-up table 300 are initialized when the network is first put into service and can be subsequently updated by some central network supervisory element.

In operation, the relative priority of two sender-chooser pair restoration efforts is determined by the relative value of their look-up table entries. For example, the relative priority of sender-chooser pair 201/202 is found at table entry 306 and is equivalent to 21. Likewise, the relative priority of sender chooser pair 203/204 is found at table entry 308 and is equivalent to 17. Since 21 is greater than 17, the restoration effort for sender-chooser pair 201/202 would therefore have a higher priority than the restoration effort for sender-chooser pair 203/204.

In an alternative embodiment, priorities are determined based upon a predefined arithmetic combination of the sender and chooser node IDs. This alternative approach eliminates the need to maintain a table in memory. However, this approach may require careful consideration of the assignment of node IDs to ensure that the resulting priority values for possible sender-chooser pairs are unique.

By using any of the prioritization methods described above, the sender nodes are able to identify the priority of their own restoration effort and subsequently alert other nodes of that priority by including the priority in a status message. Only one status message is sent per span for each failed span (as opposed to sending the same status message on every spare link in the span). This information is used by the nodes in the network to determine which sender-chooser pair should actively be seeking a restoration path.

In the present invention, "failed" status messages are used to alert the nodes in the network that a restoration effort has begun (i.e., at least one link in a span has failed) and "finished" status messages are used to alert the nodes in the network that a restoration effort has completed. If a failed status message is received, a node determines, based upon relative priority, whether to suspend processing of a current restoration effort. This suspension of processing includes the queuing of forward flooding and/or reverse linking messages that are flowing through that node. Alternatively, if a "finished" status message is received, a node determines, based upon relative priority, whether to resume processing of any queued messages. These interactions are described in greater detail below.

Generally, status messages are originated by the sender node. If at least one link in a span has failed and subsequently been validated (e.g., expiration of an alarm validation timer), the sender node sends out a failed status message alerting the nodes in the network that a restoration effort has begun between the nodes adjacent to the failed link in the span. These failed status messages are sent out at or around the same time that forward flooding messages are sent out by the same sender node. Additionally, these failed status messages are forwarded by tandem nodes until a maximum hop count is reached. This restriction ensures that a higher priority restoration effort does not suspend a lower priority restoration effort in a separate part of the network.

Finished status messages, on the other hand, are sent by the sender node upon a determination that each of the failed links in a span have been rerouted to suitable restoration paths. This determination is made based upon a receipt of confirmation messages that are sent in response to the sender node's connect messages. Alternatively, a finished status message is sent by the sender node upon the expiration of a sender-timeout timer that limits the duration of the sender node's search for restoration paths. The forwarding of finished status messages alerts each of the nodes within a maximum hop-count limit that the restoration effort for that particular sender-chooser pair has been completed. If a lower priority restoration effort was previously suspended, the affected nodes can resume processing of any queued messages.

As described above, the use of status messages (i.e., failed or finished) informs the nodes in the network of the start or completion of a restoration effort. These messages can be received during any stage of the general SHN process (e.g., forward flooding or reverse linking). For example, in the context of failure 240 in FIG. 2A, sender node SA and SB would send failed status messages at or around the same time as the forward flooding process for their individual restoration efforts. Preemption of one of these current restoration efforts at a particular tandem node would not occur until that tandem node determined that two competing sender-chooser pairs existed. Only at that time, would a prioritization decision be made thereby causing the tandem node to queue forward flooding messages for the lower priority sender-chooser pair.

The rules governing these various interactions/ preemptions are described below with respect to the processing of forward-flooding messages, reverse-linking messages and finally connect messages. As noted above, forward-flooding messages are originated by a sender node and are forwarded to a chooser node via one or more tandem nodes.

From the standpoint of the sender node, forward-flooding messages are sent only if the sender node has not received a failed status message from a higher priority sender-chooser pair. Thus, if a failed status message from a higher priority sender-chooser pair has been received, the sender node places the forward-flooding messages in queues dedicated to each of the available outgoing spans. Clearly, if a node acts as a sender node for two separate chooser nodes, the single sender node can internally determine which forward-flooding messages should be queued.

If the sender node is part of a sender-chooser pair having the highest restoration priority, the sender node can send a forward-flooding message on an available spare link or preempt a previously sent lower-priority message. This process of sending a single forward-flooding message is described with reference to FIG. 4.

First, at step 402, a determination is made whether any spare ports, used or unused (i.e., with or without assigned messages, respectively), are available on the span of interest. If a spare port is not available, then the processing for that span is completed. If a spare port is available, a determination is next made in step 404 of whether an unused spare port is available. If an unused spare port is available, a forward-flooding message is assigned to that unused spare port in step 410.

Conversely, if an unused spare port is not available, the sender node selects a port having the lowest priority message based upon the sender-chooser priority assignments. Specifically, in step 406, the list of spare ports is searched to determine the spare port that is currently assigned a message having the lowest priority. After this determination, the sender node, in step 408, places the incumbent message in the transmit queue for that span. Finally, in step 410, the sender node sends the higher priority forward flooding message out on that port.

Figure 4:
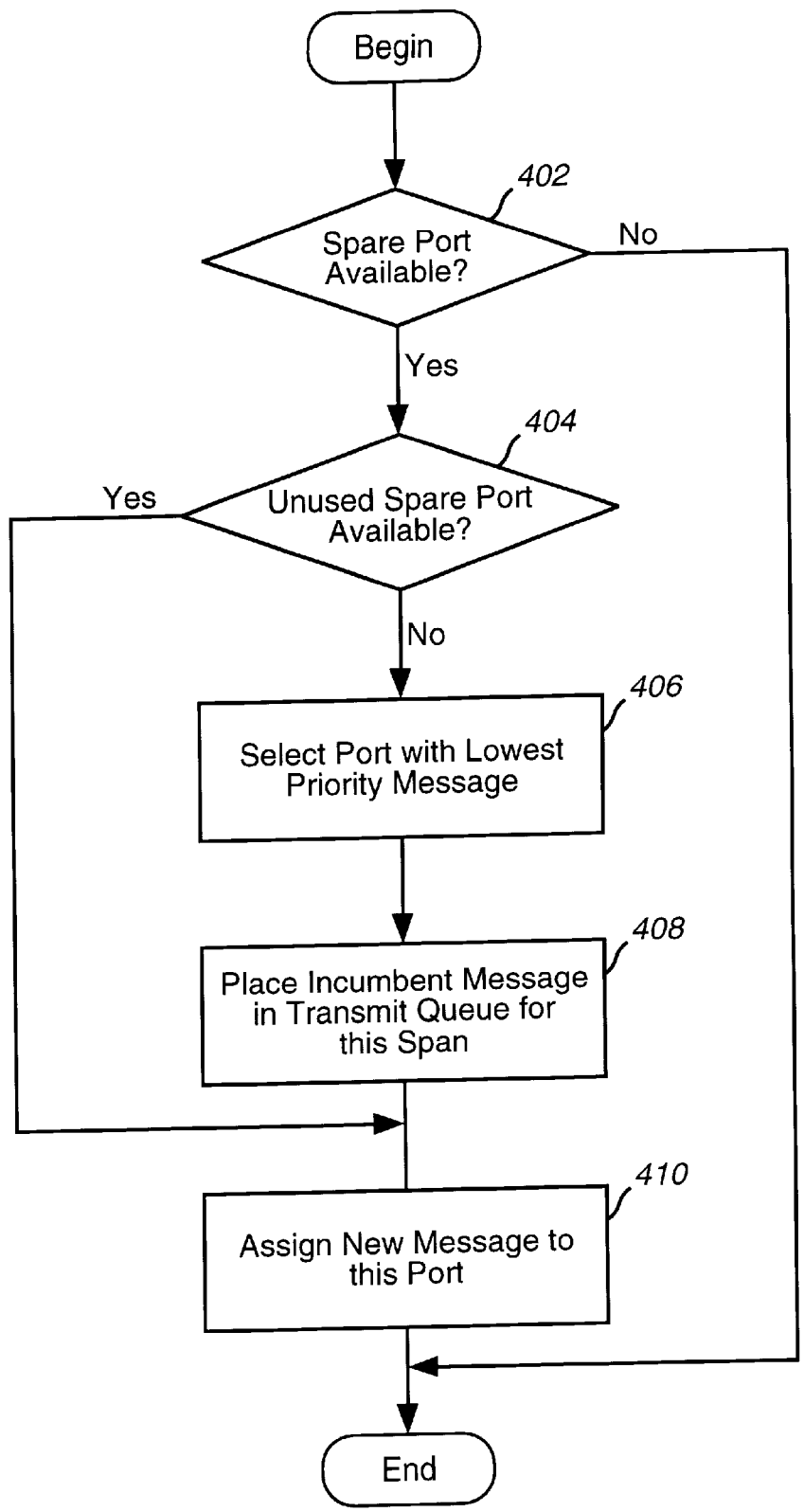
FIG. 4 illustrates a flow chart of the port selection and preemption process.

The process illustrated in FIG. 4 is also applicable to tandem nodes that seek to forward any previously received forward flooding messages. The only difference is that the tandem node did not originate the forward flooding message. Otherwise, the preemption and queuing process is identical as compared to the sender node.

Figure 5A:
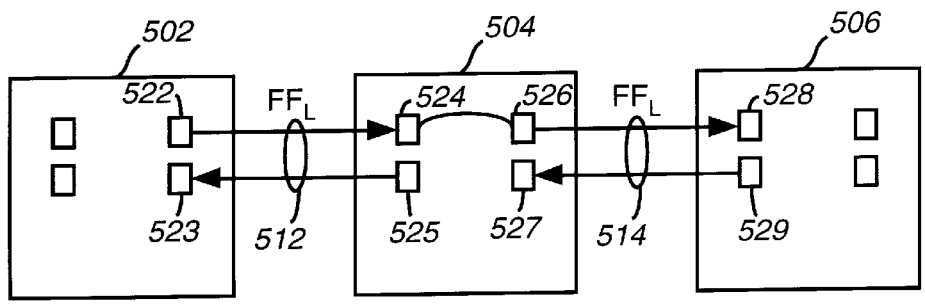
FIGS. 5A–5D, 6A–6C, and 7A–7B illustrate examples of the interaction between high-priority and low-priority messages within the network.
Figure 5B:
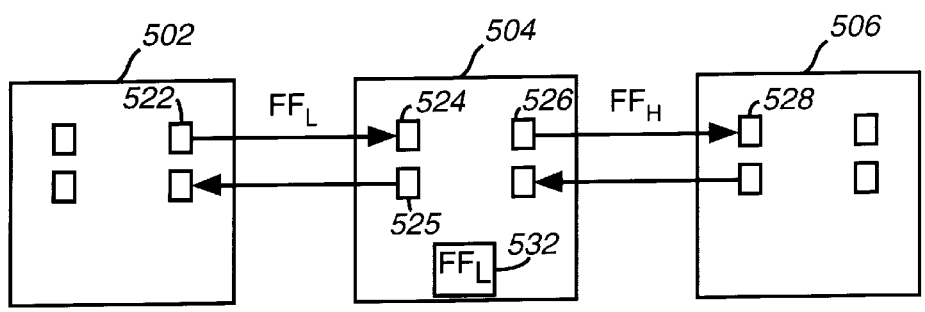
Figure 5C:
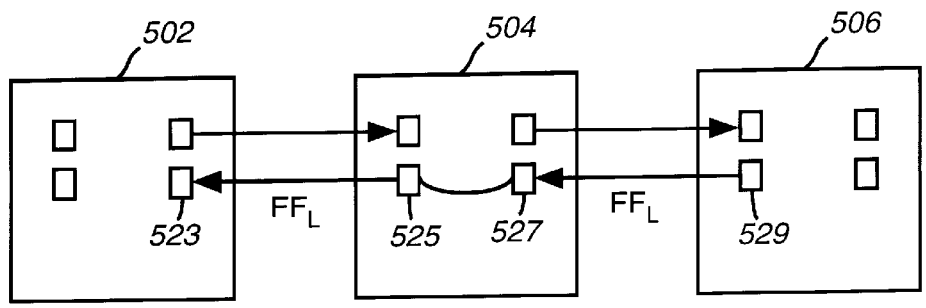
Figure 5D:
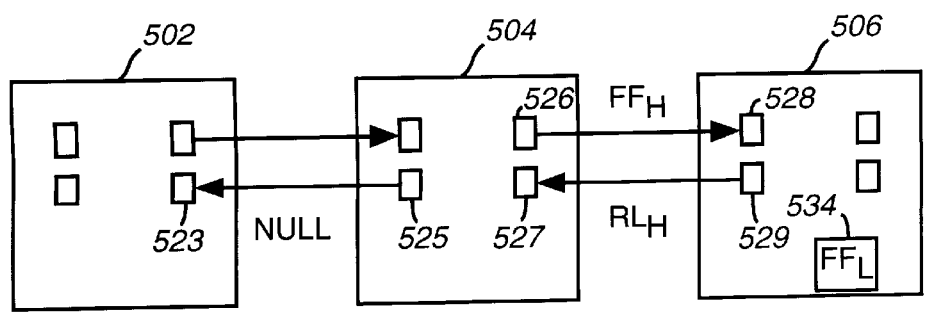

In a preferred embodiment, sender nodes and tandem nodes, in processing forward-flooding messages, can use outgoing ports on currently used spare links in two situations. The first situation is where only a forward-flooding message (incoming or outgoing) exists on the spare link. Two scenarios are illustrated in FIGS. 5A–5D. FIGS. 5A and 5B illustrate the preemption of an outgoing forward-flooding signal, while FIGS. 5C and 5D illustrate the eventual cancellation of an incoming forward-flooding signal.

FIGS. 5A and 5B illustrate a high-level overview of flooding between nodes 502, 504 and 506. Nodes 502 and 504 are connected by bidirectional spare link 512 and nodes 504 and 506 are connected by bidirectional spare link 514. In this configuration, ports 525 and 526 in node 504 are termed outgoing ports and ports 524 and 527 in node 504 are termed incoming ports. As further illustrated by FIG. 5A, a forward-flooding signal ($FF_L$) is transmitted from node 502 on port 522 and received by node 504 at port 524. Node 502 could be a sender node or a tandem node. Acting as a tandem node, node 504 forwards $FF_L$ to node 506 via ports 526 and 528. If a suitable restoration path is found based upon this $FF_L$ a reverse linking message ($R_L$) would be forthcoming from node 506 (either originated or forwarded) via ports 529 and 527. Node 504 would then forward $RL_L$ to node 502 via ports 525 and 523.

At the point in time illustrated by FIG. 5A, assume that a span failure has occurred between node 504 and another node (not shown). Further assume that node 504 has the sender role. If the restoration effort of sender node 504 has a higher priority than the restoration effort that propagated $FF_L$, then $FF_L$ can be preempted. Of course, this preemption assumes that there are no unused spare ports between nodes 504 and 506.

As illustrated next in FIG. 5B, the higher priority forward-flooding signal $FF_H$ replaces the incumbent $FF_L$ at outgoing port 526. $FF_L$ is then placed in queue 532 that is dedicated to the span that includes spare link 514. Since sender node 504 would also seek to flood a link on the span between nodes 502 and 504, outgoing port 525 on link 512 could also be flooded with $FF_H$ (assuming again that unused spare ports are not available). This later situation dealing with links receiving lower priority forward-flooding signals is addressed in FIGS. 5C and 5D.

As noted in FIG. 5C, node 504 acts as a tandem node in forwarding $FF_L$ from incoming port 527 to outgoing port 525. Assume that a span failure has occurred between node 504 and another node (not shown) and that node 504 has the sender role. If the restoration effort of sender node 504 has a higher priority than the restoration effort that propagated $FF_L$, then the $FF_L$ that is received on incoming port 527 may eventually be canceled.

As illustrated in FIG. 5D, sender node 504 sends $FF_H$ on outgoing port 526. In response to $FF_H$, node 506 can either originate or forward a complement $RL_H$ to node 504 via ports 529 and 527. $RL_H$ cancels the previously received $FF_L$ (see FIG. 5C). If node 506 originates $RL_H$, then $FF_L$ is placed in queue 534 that is associated with the span that includes spare link 514.

If $RL_H$ is received at incoming port 527, sender node 504 replaces $FF_L$ on outgoing port 525 with a NULL message. This action occurs due to the change in status of precursor port 527 for outgoing port 525. $FF_L$ is not queued in node 504. Alternatively, as previously described with reference to FIG. 5B, $FF_L$ on outgoing port 525 could be immediately replaced with another $FF_H$ message at or around the time sender node 504 sent an $FF_H$ message on port 526 to node 506.

Figure 6A:
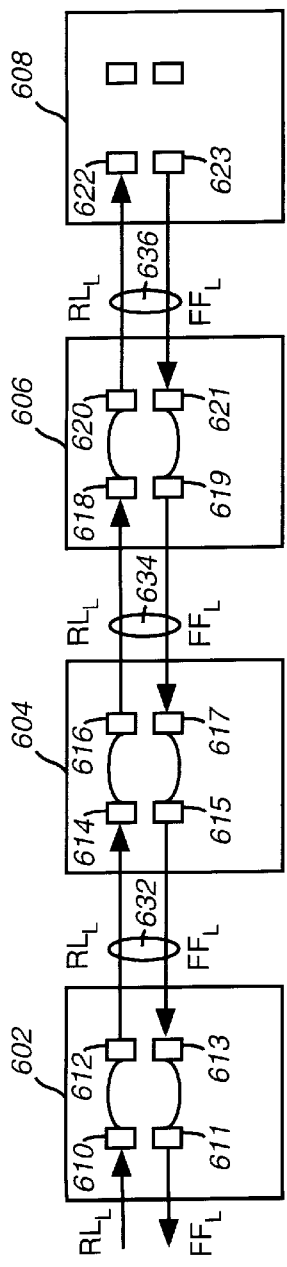

Having described the use of spare links having only forward-flooding messages, the use of spare links having both forward-flooding and reverse-linking messages is now described with reference to FIGS. 6A–6C. In FIG. 6A, nodes 602, 604, 606, and 608 operate as tandem nodes that forward $FF_L$ from right-to-left via odd-numbered ports 611–623 and forward a corresponding $RL_L$ from left-to-right via even-numbered ports 610–622. Assume now that a span failure has occurred between node 604 and another node (not shown) and that node 604 has the sender role. If the restoration effort of sender node 604 has a higher priority than the restoration effort that propagated $FF_L$ and $RL_L$, then the sequence of processing in FIGS. 6B and 6C follows.

Figure 6B:
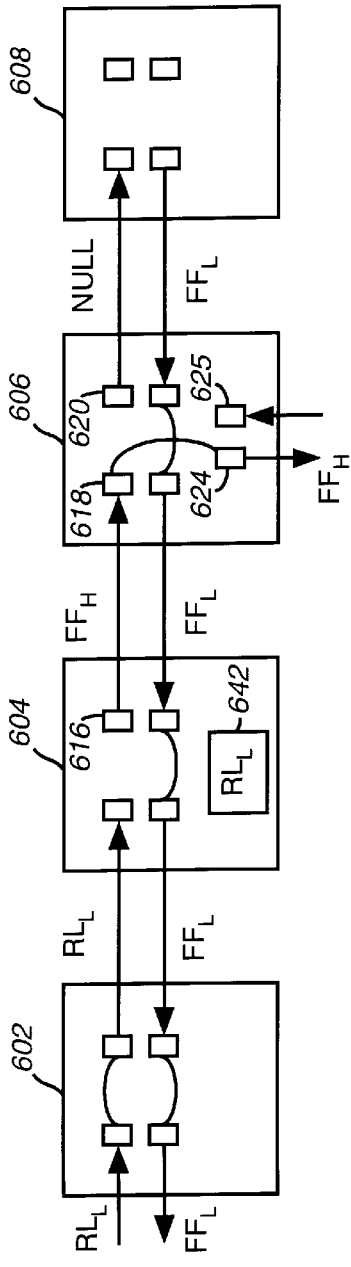

First, as illustrated in FIG. 6B, sender node 604 preempts $RL_L$ on outgoing port 616 with $FF_H$. $RL_L$ is subsequently placed in queue 642 that is dedicated to the span that includes spare link 634. Upon receipt of $FF_H$ at incoming port 618, node 606 forwards $FF_H$ onto outgoing port 624 to an adjacent node (not shown). A second $FF_H$ is also forwarded to node 608 via an unused spare link (not shown). Additionally, node 606 sends a NULL message on outgoing port 620 since the precursor port (i.e., incoming port 618) of outgoing port 620 received a new message that canceled the previously received $RL_L$ (see FIG. 6A). Here, it should be noted that the NULL message sent on outgoing port 620 could also be another forward-flooding message. In particular, the NULL message could be another $FF_H$ message.

Figure 6C:
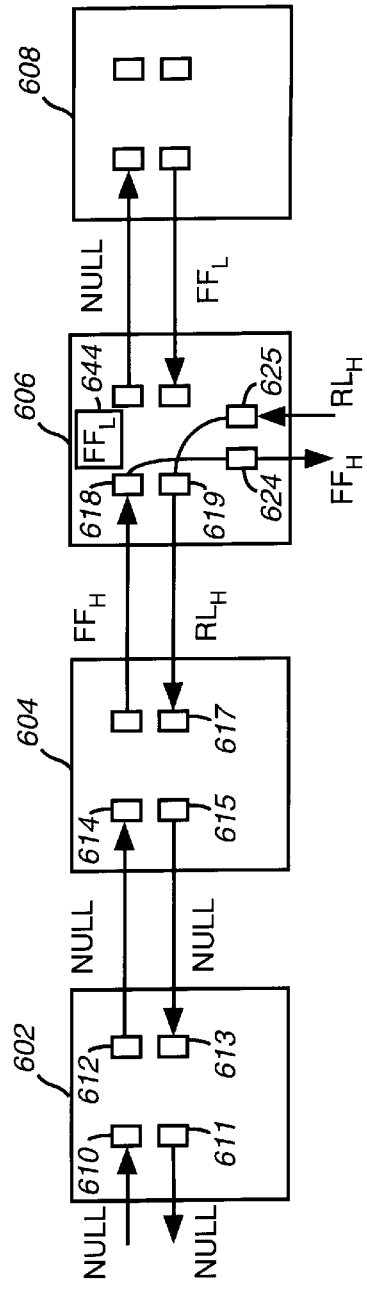

Next, as illustrated in FIG. 6C, node 606 receives $RL_H$ on incoming port 625 in response to $FF_H$ that was previously sent on outgoing port 624. Node 606 then forwards $RL_H$ to sender node 604 via outgoing port 619. Since, $FF_L$ has now been preempted on outgoing port 619, it is placed in queue 644 that is associated with the span that includes spare link 634. After sender node 604 receives $RL_H$ on incoming port 617, sender node 604 adds the path identified by $FF_H$ and $RL_H$ to the list of restoration routes. Sender node 604 will choose this particular path when the connection process begins (e.g., expiration of a holdoff timer).

Additionally, after $RL_H$ is received on incoming port 617, a NULL message is sent by sender node 604 on outgoing port 615 effectively canceling the previously transmitted $FF_L$ (see FIGS. 6A and 6B). This results since incoming port 617 is the precursor port of outgoing port 615. Similarly, further NULL messages are sent on outgoing port 611 to another node (not shown). Eventually, a NULL message is received by node 602 on incoming port 610. Finally, node 602 sends a NULL message on outgoing port 612 to node 604.

At this point, all of the $FF_L$ and $RL_L$ messages of FIG. 6A have been overwritten except for the $FF_L$ message on link 636. The original $FF_L$ also resides in queue 644. After sender node 604 sends out finished status messages indicating that the higher priority restoration effort has completed, node 606 will then attempt to place $FF_L$ on one of the spare links in the span between nodes 604 and 606.

As described above, sender nodes and tandem nodes, in processing forward-flooding messages, can send messages on currently used spare links in a variety of situations. Additional rules also exist for the processing by tandem nodes and chooser nodes of reverse linking messages. Generally, a chooser node or a tandem node can send a reverse-linking message only if no higher-priority span restoration is ongoing in the network. If a failed status message for a higher priority sender-chooser pair has been received, the tandem or chooser node queues the reverse-linking message. If the choser node or tandem node is not aware of any other higher-priority span restoration efforts, the node can preempt a forward-flooding message or a release message of a lower-priority span restoration. This latter situation is illustrated by outgoing port 619 in FIG. 6C.

Figure 7A:
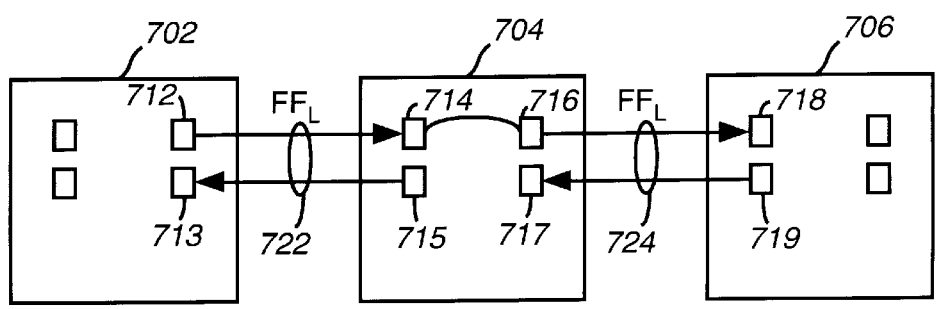
Figure 7B:
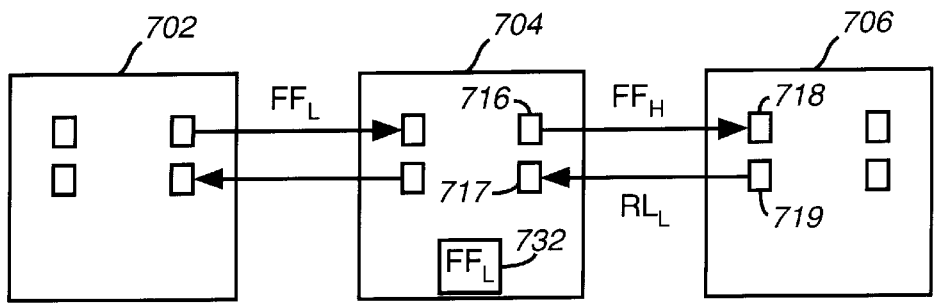

An additional consideration for tandem node processing of reverse-linking messages is described with reference to FIGS. 7A and 7B. FIG. 7A illustrates an $FF_L$ message that is forwarded from node 702 to node 704 and then to node 706. Assume now that a span failure has occurred between node 704 and another node (not shown) and that node 704 has the sender role. If the restoration effort of node 704 has a higher priority than the restoration effort that propagated $FF_L$, then $FF_H$ can preempt $FF_L$ on outgoing port 716. $FF_L$ is placed in queue 732 associated with the span that includes link 724.

If node 706 (possibly a chooser node) has not yet received a failed status message from sender node 704, a $RL_L$ may be returned to node 704 via incoming port 717 around the time that node 704 is sending $FF_H$ on outgoing port 716. Because of this possible scenario, node 704 checks whether the incoming $RL_L$ corresponds to the forward-flooding message on outgoing port 716. If the forward-flooding message on outgoing port 716 (i.e., $FF_H$) does not match the incoming reverse-linking message (i.e., $RL_L$) then the incoming reverse-linking message is terminated. In other words, unlike the queuing of $RL_L$ in FIG. 6B, the reverse-linking message is discarded because it has no correlation to any forward flooding message on link 724.

Finally, processing by sender nodes and tandem nodes of connect messages also abides by a similar set of rules. Specifically, a sender node or a tandem node can send a connect message only if no higher-priority span restoration is ongoing in the network. If a failed status message for a higher priority sender-chooser pair has been received, the tandem or chooser node queues the connect message. As noted above, a link having a forward-flooding, reverse-linking, and a connect message cannot be preempted by a higher priority span restoration.

While the invention has been particularly shown and described with reference to preferred embodiments thereof, it will be understood by those skilled in the relevant art that various changes in form and details may be made therein without departing from the spirit and scope of the invention.

What is claimed is:

1. A method for restoring interrupted communications in network having a plurality of nodes interconnected by spans, wherein each span comprises at least one link, the method comprising the steps of:

(1) sending by a first sender node of a first sender-chooser pair a failed status message that includes an information field identifying a priority of a first restoration effort of said first sender-chooser pair, wherein said failed status message alerts other nodes to temporarily suspend processing of restoration messages associated with lower priority restoration efforts even if said other nodes have unused spare ports;

(2) determining by a second node that receives said failed status message whether an ongoing second restoration effort of the second sender-chooser pair has a higher priority than said first restoration effort;

(3) determining by said second node whether any unused spare ports on the span are available;

(4) if said first restoration effort has a higher priority than said second restoration effort and no unused spare ports on said span are available, pre-emptying a second restoration message associated with said second restoration effort that was previously sent on an outgoing port of said span and sending by said second node a restoration message associated with said first restoration effort on said outgoing port;

(5) placing by said second node said restoration message associated with said second restoration effort in a queue associated with said span;

(6) sending by said first sender node a finished status message after said first restoration effort is complete; and (7) determining by said second node upon receipt of said finished status message whether said restoration message associated with said second restoration effort can be placed on an available outgoing port on said span.

2. The method of claim 1, wherein said step (4) comprises the step of sending a forward-flooding message on said outgoing port.

3. The method of claim 1, wherein said step (4) comprises the step of sending a reverse-linking message on said outgoing port.

4. The method of claim 1, wherein said step (5) comprises the step of placing a forward-flooding message in said queue.

5. The method of claim 1, wherein said step (5) comprises the step of placing a reverse-linking message in said queue.

6. The method of claim 1, further comprising the step of:

(8) replacing by said second node a restoration message that was previously sent on an outgoing port of a span with a null message if a precursor port of said outgoing port has received a different restoration message.

7. The method of claim 1, further comprising the step of:

(9) discarding a reverse linking message that is received on an incoming port from a third node when a forward flooding message has been sent on an outgoing port associated with said incoming port, said reverse linking message being associated with said second restoration effort and said forward flooding message being associated with said first restoration effort.

8. The method of claim 1, where step (1) comprises the step of sending said failed status message out substantially simultaneous with a forward flooding message.

9. A method for restoring interrupted communications in a network having a plurality of nodes interconnected by spans, wherein each span comprises at least one link, the method comprising the steps of:

(1) validating a failure in at least one link in a span, wherein said span connects a first sender-chooser pair having a first sender node and a first chooser node;

(2) sending by said sender node a failed status message to other nodes in the network within a maximum hop limit, wherein said failed status message includes an information field identifying a priority of a first restoration effort between said first sender node and said first chooser node; and (3) suspending temporary, by a second node that receives said failed status message, further transmission of restoration messages that are associated with a second restoration effort associated with a second sender-chooser pair if said restoration messages associated with said second restoration effort have a lower priority than restoration messages associated with said first restoration effort even if said second node has unused spare port.

10. The method of claim 9, further comprising the step of:

(4) sending by a second node a message associated with said first restoration effort on an outgoing port on which a message associated with said second restoration effort was previously sent if said first restoration effort has a higher priority than said second restoration effort; and (5) placing by said second node said message associated with said second restoration effort in a queue associated with a span that includes said outgoing port.

11. The method of claim 9, further comprising the step of:

(6) replacing by said second node a message that was previously sent on an outgoing port of a span with a null message if a precursor port of said outgoing port has received a different message.

12. The method of claim 9, further comprising the step of:

(7) discarding a reverse linking message that is received on an incoming port from a third node when a forward flooding message has been sent on an outgoing port associated with said incoming port, said reverse linking message being associated with said second restoration effort and said forward flooding message being associated with said first restoration effort.

13. The method of claim 9, wherein step (2) comprises the step of sending said failed status message out substantially simultaneous with a forward flooding message.

14. A controller for enabling a processor to coordinate competing restoration efforts between more than one sender-chooser pairs, wherein a sender-chooser pair includes nodes that are adjacent to a span having a failure in at least one link within the span, said controller comprising:

means for enabling said processor to compare relative priorities of each restoration effort that is identified by a received failed status message sent by a sender node of each sender-chooser pair;

means for enabling said processor to temporary suspend further transmission of restoration messages that are associated with each restoration effort that does not have a highest priority regardless of availability of spare port; and means for enabling said processor to place a restoration message that was previously sent on an outgoing port in a queue when a higher priority message is sent on said outgoing port.

15. The controller of claim 14, further comprising means for enabling said processor to determine whether a queued restoration message can be placed on an available outgoing port after a finished status message associated with a higher priority restoration effort has been received.

16. The controller of claim 14, further comprising means for enabling said processor to replace a message that was previously sent on an outgoing port of a span with a null message if a precursor port of said outgoing port has received a different message.

17. The controller of claim 14, further comprising means for enabling said processor to discard a reverse linking message that is received on an incoming port when a forward flooding message has been sent on an outgoing port associated with said incoming port, said reverse linking message being associated with a lower-priority restoration effort and said forward flooding message being associated with a higher-priority restoration effort.

* * * * *